United States Patent Office 3,654,324
Patented Apr. 4, 1972

3,654,324
SYNTHESIS OF METHYL STERCULATE
Walter J. Gensler, Belmont, Mass., assignor to the United States of America as represented by the Secretary of Agriculture
No Drawing. Filed Mar. 31, 1970, Ser. No. 24,339
Int. Cl. C07c 69/74, 61/18
U.S. Cl. 260—410.9 R   2 Claims

ABSTRACT OF THE DISCLOSURE

This invention relates to the preparation of methyl sterculate and the preparation of a new intermediate, the diacid chloride of 9,10-(carboxymethano)-9-octadecenoic acid. Methyl stearolate and diazoacetic ester react in the presence of copper bronze to form methyl 9,10-carbethoxymethano)-9-octadecenoate (70%). Saponification followed by treatment with oxalyl chloride gives the corresponding bis-acid chloride. Exposure to anhydrous zinc chloride at room temperature leads to loss of carbon monoxide and to generation of a cyclopropenium ion-acid chloride intermediate. After esterification with methanol, the resulting cyclopropenium ion-ester is reduced with sodium borohydride to give methyl sterculate. A number of procedures established the identify and homogeneity of the product. The overall yield is in the order of 30%.

various species of the order Malvales, including the common cotton plant, *Gossypium hirsutum*. It is known that sterculic and malvalic acids as well as other cyclopropene derivatives show unusual physiological and biochemical properties.

Having some interest in developing a practical preparation of such cyclopropene acids, we tried a published synthesis, one in which addition of methylene across the triple bond of stearolic acid (9-octadecynoic acid) by treatment with diiodomethane and zinc-copper couple gave sterculic acid in 4% yield. However, we were unable to detect any of the desired acid. The same was true when methyl stearolate was mixed with diazomethane in the presence of cuprous chloride or bromide. Further work has now led to a six-step synthesis (2→7) by which methyl sterculate (7) can be formed from methyl stearolate in ca. 30% overall yield.

It has been shown that diazoacetic ester in the presence of copper bronze reacts with methyl stearolate (2) to produce the diester of compounr 3. Saponification gives the diacid, 9,10-(carboxymethano)-9-octadecenoic acid (3) in 60–70% conversion from methyl stearolate or, if recovered stearolic acid is taken into account, in 70–90% yield. Direct decarbonylation of cyclopropenyl acids such as 3 with perchloric acid-acetic anhydride to give the corresponding

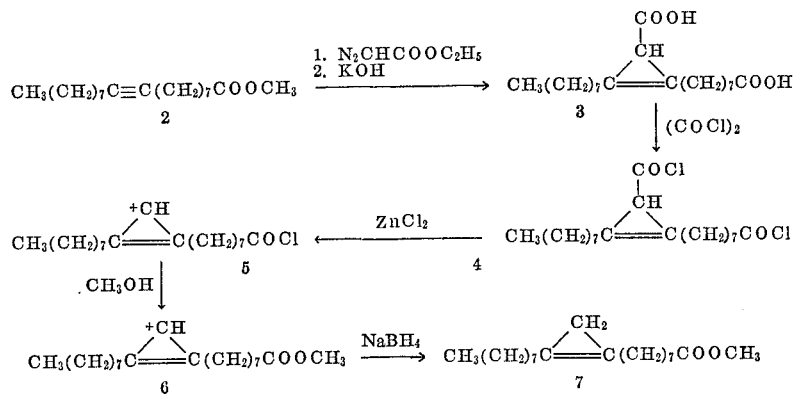

A non-exclusive, irrevocable, royalty-free license in the invention herein described, throughout the world for all purposes of the United States Government, with the power to grant sublicenses for such purposes, is hereby granted to the Government of the United States of America.

On the basis of degradation experiments, Nunn [J. R. Nunn, J. Chem. Soc., 313 (1952)] proposed the structure of 9,10-(methano)-9-octadecanoic acid (1a) for sterculic acid, the preponderant acid in *Sterculia foetida* seed fat. This cyclpropene C–19 acid together with the homologous C–18 malvalic acid (1b) have been found widely distributed in

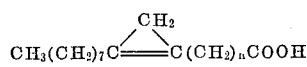

1a (*n*=7): sterculic acid
1b (*n*=6): malvalic acid cyclopropenium ion is a known process. However, to get around using the potentially hazardous perchloric-acetic anhydride reagent, we chose to operate via the acid chloride 4, which could be formed smoothly either with thionyl chloride or oxalyl chloride. The action of a Lewis acid was expected to selectively decarbonylate the cyclopropenyl acid chloride without involving the other acid chloride grouping. Although aluminum chloride, ferric chloride, and zinc chloride were all found to be effective in such decarbonylation, we eventually settled on zinc chloride as the reagent of choice for the conversion of 4 to 5.

Treatment of the cyclopropenium ion-acid chloride 5 with a mixed metal hydride would reduce not only the cation but also the acid chloride grouping. To block this, methanol was introduced so as to convert the acid chloride 5 to ester 6. Action of methanol at the cyclopropenium site to form a methyl ether was regarded as of little consequence, since under the experimental conditions, ether formation was expected to be reversible. In the last stage, sodium borohydride with cyclopropenium ion 6 produced methyl sterculate (7) in about 40% yield calculated from diacid 3.

Methyl sterculate was obtained as a colorless oil, sensitive to air as well as heat. The absence of olefinic proton magnetic resonance in the 6–7 p.p.m. region served to eliminate the a priori possible grouping 8 and,

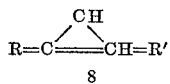

for that matter, *any* olefinic structures other than that of methyl sterculate (7). When spotted on a thin layer chromatography plate with a sample of methyl sterculate from *Sterculia foetida*, the synthetic and natural esters both gave single spots with the same $R_f$ value. The synthetic methyl sterculate showed the expected features in its nuclear magnetic resonance and its infrared absorption spectra. These spectra were indistinguishable from those taken with the natural material. Gas-liquid chromatography on the synthetic and natural esters produced curves that were virtually superposable; both however showed two peaks, one of which, as recognized before, is due to thermal rearrangement after injection. For further check on homogeneity and identity, the synthetic and natural methyl sterculates were converted to their methyl thiol adduct. The two adducts gave identical gas-liquid chromatography curves showing a single symmetrical peak. The infrared and the nuclear magnetic resonance absorption curves were also identical. Another kind of gas-liquid chromatographic assay, involving preliminary cyclopropene ring cleavage with methanolic silver nitrate, indicated that the synthetic material was 100% methyl sterculate.

EXAMPLE 1

Methyl stearolate (2): Commercially available stearolic acid, M.P. 45.5–47.5° showed one spot on a thin layer chromatography sheet when developed with chloroform-ethanol (2:1). Esterification with diazomethane gave methyl stearolate (2), B.P. 127–130° (0.02 mm.), in 96% yield after distillation. This material furnished a gas-liquid chromatography curve with a single peak at 7 min. when analyzed on a 6 ft. neopentyl glycol succinate column at 220° and 21 lb./in.² of argon. It showed one spot on a thin layer chromatography plate with hexane-benzene (10:1) as solvent and iodine vapor as developer.

EXAMPLE 2

9,10 - (carboxymethano) - 9 - octadecenoic acid (3): A three necked flask, provided with a magnetic bar stirrer, was charged with 9.0 g. (0.030 mole) of methyl stearolate (2) and 0.7 g. of powdered copper bronze. After replacing the air in the flask with nitrogen, the flask was placed in an oil bath preheated to 130–135°. After a short time, ethyl diazoacetate (6.9 g.; 0.060 mole) was added dropwise to the stirred mixture, care being taken to have the drops fall directly into the reaction mixture so as to avoid preliminary contact with the side of the flask. The nitrogen evolved was led through a vertical water-cooled condenser into a gas collector. Each drop was followed by rapid gas evolution which was practically complete in 1–2 min. After addition of all the diazoacetate (1.5–2 hr.), the reaction mixture was heated and stirred for another 10–15 min. The measured nitrogen evolution corresponded closely to the expected volume.

A solution of potassium hydroxide (10 g.; 0.18 mole) in ethanol (50 ml.) and water (10 ml.) was added to the cooled orange mixture, which was then boiled under a nitrogen atmosphere for 10 hr. Water (200 ml.) was added to the cooled alkaline mixture. The mixture was filtered and the orange homogeneous filtrate was rinsed with a 60 ml. portion of hexane (discarded). After making the cooled aqueous layer acid with 75 ml. of 10% hydrochloric acid, it was extracted thoroughly with ether. The combined extracts were washed with several portions of cold water and once with a saturated salt solution. The ether solution, dried with sodium sulfate and warmed in a 70° bath under water-pump vacuum to remove solvent, left a red oil residue (11.1 g.) of crude diacid 3.

The residue dissolved in 40 ml. of benzene-hexane (2:1) was placed on the top of a 30-cm. column (4.5 cm. diameter) of silica gel (80 g.) wet with hexane. The adsorbed material was eluted in succession with 600 ml. of benzene-hexane (2:1), 360 ml. of chloroform, and 300 ml. of chloroform-ethanol (40:1). The elution fractions (50–60 ml.) were combined on the basis of thin-layer chromatography. Most of the recovered, faintly yellow stearolic acid, (1.7 g.; 10%), M.P. 35–41.5°, came out with the benzene-hexane. When spotted on a chromatographic sheet and developed with chloroform-ethanol (2:1), both the recovered and authentic stearolic acid gave single spots with $R_f$ 0.68. The recovered material showed light streaking which was absent in the reference material. The combined materials coming out in the chloroform and the chloroform-ethanol solvents were dissolved in a small volume of chloroform, placed on the top of a silica gel (80 g.) column wet with chloroform, and eluted with 400 ml. of chloroform followed by 200 ml. of chloroform-ethanol (40:1). Volatile material was removed by concentrating the emerging solutions under water-pump vacuum (70° bath) and then exposing the residue at room temperature to a 2-mm. vacuum for 2 hr.

The 9,10-(carboxymethano)-9-octadecenoic acid (3), obtained in this way as a somewhat yellow oil, weighed 7.1 g. (70%). On a thin layer chromatographic plate with chloroform as solvent and iodine vapor for visualization, it showed a single spot although with much streaking; no spot corresponding to stearolic acid was detected. The neat liquid had infrared absorption peaks at 1700 (carboxylic carbonyls) and 1900 cm.$^{-1}$ (cyclopropene). The diacid 3 as a 25% solution in carbon tetrachloride showed nuclear magnetic resonance signals at 0.85 (3 H; $CH_3$), 1.1–1.8 (22 H, multiplet), 1.92 (1 H, s., cyclopropene H), 2.08–2.52 (6 H, diffuse multiplet, $CH_2$'s at positions 2, 8, and 11), and 12.0 p.p.m. (2 H, s., 2 COOH). No olefinic proton signal could be detected in the 4–7 p.p.m. region.

*Analysis.*—Calcd. for $C_{20}H_{34}O_4$ (percent): C, 70.97; H, 10.12. Found (percent): C, 71.20; H, 10.21.

Allowing the diacid 3 to stand for a month at −4° afforded no solid. However, seeding with a minute crystal of the nor-compound, 8,9 - (carboxymethano) - 8-heptadecenoic acid, initiated slow crystallization. The melting point, taken with the sample in a sealed tube, 24.5–26.0°.

When the above directions were followed but with the ratio of diazoacetic ester to methyl stearolate 1.3:1 instead of 2:1 and the temperature 145° instead of 135°, the yield of 9,10-(carboxymethano)-9-octadecenoic acid (3) dropped to 46%. Since diazoacetic ester loses nitrogen under these conditions at temperatures as low as 82°, a 1.3:1 reaction was performed at 82–85°. No improvement was noted, diacid 3 being obtained in 48% yield.

EXAMPLE 3

Diacid chloride 4 of 9,10-(carboxymethano)-9-octadecenoic acid: Oxalyl chloride (6.0 g.; 0.047 mole) was added in one portion to the stirred diacid 3 (4.0 g.; 0.012 mole) in 40 ml. of ether. The reaction mixture was protected from atmospheric moisture with a calcium chloride tube. Stirring was continued in the dark and at room temperature for 2 hours. After low-boiling materials were removed under water aspirator pressure, the residual product was pumped at room temperature (0.3 mm.) for 10 hours. The diacid chloride 4 obtained in this way (4.3 g.; 98%) was a red oil, which had no hydroxyl absorption peak but which did show maxima at 1760 and 1798 (carbonyls) and at 1900 cm.$^{-1}$ (cyclopropene).

At attempt at a short path distillation at bath temperatures up to 180° (10$^{-3}$ mm.) failed; polymerization occurred to a rubbery brown mass.

EXAMPLE 4

Methyl sterculate (7): Decarbonylation was effected by stirring a mixture of the above diacid chloride 4 (0.012 mole), anhydrous granular zinc chloride (1.6 g.; 0.012 mole), and 40 ml. of dichloromethane at room temperature. A current of dry nitrogen blanketed the reaction mixture throughout the experiment. Mild foaming was observed from the heterogeneous system as soon as the zinc chloride was added. After 3 hours of stirring in the dark, the reaction mixture, now dark purple, had become homogeneous. When arrangement was made to collect the gas evolved, it was found that close to the theoretical amount of carbon monoxide was produced.

To form ester 6, the reaction mixture was brought to 3° and 0.48 ml. (0.012 mole) of absolute methanol was injected from a syringe. Stirring at ice-bath temperature was continued for about 20 min. to allow the esterification to go to completion.

The dichloromethane solution of compound 6 was dropped into a vigorously stirred solution of sodium borohydride (2.2 g.; 0.058 mole) and sodium hydroxide (1.0 g.; 0.025 mole) in 50 ml. of anhydrous methanol over a period of 15 min. (It may be noted that whether the borohydride substrate is the cyclopropenium ion, the covalent chloride, or an ether is actually not known.) The stirred mixture was held in a acetone-dry ice bath at —30 to —35°. The deep purple color was discharged very quickly, so that the reaction mixture remained yellow. After a further 10 minutes of stirring, the bath was removed and stirring continued for 30 minutes while the flask warmed to room temperature. Some gas evolution was noted during this period.

With ice-bath cooling, the reaction mixture was treated first with water (100 ml.) and then with 40 ml. of 10% hydrochloric acid. The mixture was extracted without delay with three 60 ml. portions of ether, and the combined organic extracts were washed in order with water, 5% sodium bicarbonate solution, water, and saturated salt solution. After drying with magnesium sulfate, the solution was exposed at room temperature to a water-pump vacuum. The residual crude methyl sterculate (7), as an orange oil, weighed 3.5 g.

The oil in a small volume of hexane was placed on the top of a column of silica gel (35 g.; 2.2 cm. diameter) prepared with the help of hexane. A total of 700 ml. of hexane was then allowed to flow through the column. The emerging liquid was collected in 100 ml. fractions, which were combined on the basis of thin-layer chromatography results. After removing most of the solvent by room-temperature distillation under vacuum, the residual oil was pumped for 2 hours at room temperature at 0.25 mm. The desired methyl sterculate (7) was obtained in this way as a colorless mobile oil (1.5 g.; 41% from diacid 3) giving a positive Halphen test for cyclopropene.

*Analysis.*—Calcd. for $C_{20}H_{36}O_2$ (percent): C, 77.82; H, 11.76. Found (percent): C, 77.83; H, 11.64.

Methyl sterculate becomes yellow within minutes at 60–70° and after 4–6 hours at room temperature even under nitrogen. Neither a dilute (<1%) hexane solution of pure methyl sterculate over a period of 10 weeks at 2° nor the neat liquid stored at —17° for 3 months acquired color or developed new thin layer chromatography spots. Storage for long periods as a solid at —78° is possible without deterioration. Three repetitions of the four-stage conversion from diacid 3 produced methyl sterculate in 34, 43, and 38% yield. The synthetic methyl sterculate as a 30% solution in carbon tetrachloride shows nuclear magnetic resonance signals at 0.74 (s., cyclopropene $CH_2$) 0.89–0.95 (distal $CH_3$), 1.3 (22 H), 2.1–2.45 (6 H, multiplet, $CH_2$'s at positions 2, 8, and 11), and 3.54 p.p.m. (3 H, s., $COOCH_3$). The integration from 0.65 to 1.1 p.p.m. corresponded to 5 protons. Even with neat material, no signal was observed or was detected by integration in the 3.5–8 p.p.m. olefinic region. This result showed, after calibration with elaidic acid in carbon tetrachloride, that isomeric impurities with one or two olefinic hydrogens, if present at all, are limited to 4%.

EXAMPLE 5

Comparison of synthetic and natural methyl sterculate: A 0.3 g. sample of the urea adduct of pure methyl sterculate (ca. 15% ester) derived from *Sterculia foetida* by Dr. A. R. Johnson and his colleagues was shaken with 3 ml. of water. The turbid mixture was extracted with two small volumes of hexane. The combined extracts were washed twice with water, dried with magnesium sulfate, and then concentrated.

Synthetic and natural methyl sterculate, spotted side by side on an Eastman sheet, developed with chloroform-benzene (5:2), and detected with iodine vapor, produced single spots, both with $R_f$ 0.83. On Gelman plates with hexene-benzene (10:1) as solvent, both samples gave single spots, $R_f$ 0.75. In another run, the synthetic material alone on a chromatographic plate with hexane-ether (12:1) showed a single spot, $R_f$ 0.65.

Synthetic and natural methyl sterculates had $n_D^{25}$ 1.4534 and 1.4524, respectively. The value reported before is 1.4571.

The infrared absorption curves taken with the neat oils showed peaks at 1740 as well as at 1875 (weak) and 1000 cm.$^{-1}$ (medium), and were essentially superposable from 4000–700 cm.$^{-1}$. The nuclear magnetic resonance curves determined with the two materials as 20% solutions in carbon tetrachloride were identical.

Gas-Liquid chromatography was performed on a 6 foot silicone column (10% SF 96) at a column temperature of 230° and an argon carrier gas pressure of 22 lb./in. Both samples gave identical curves with the main peak at 15 and a secondary peak at 18.5 min. Another comparison was made on a column of neopentyl glycol succinate at 190° and a 20 lb./in. pressure of argon. Both natural and synthetic methyl sterculates gave curves with peaks at 9.2 and 12.3 min. subtending area in the ratio 11:89. When equal volumes (0.7 microliters) of the two materials were injected, the sum of the areas under the two peaks was, respectively, 395 and 390 arbitrary units. In the neopentyl glycol succinate runs, a slow moving minor peak (less than 1%) appeared at 16.2 min. on both curves. More than two peaks appeared when synthetic methyl sterculate was put through a diethyleneglycol succinate column at 185°, an effect possibly attributable to the longer time on the column.

When the synthetic material was analyzed by the silver nitrate-methanol procedure, the content of methyl sterculate was found to be 100%.

EXAMPLE 6

Methane thiol adduct of methyl sterculate (7). A mixture of 0.30 g. of synthetic methyl sterculate and 2 ml. of a solution of methyl mercaptan in anhydrous benzene (ca. 10%) was allowed to stand for 2 days at room temperature. Volatiles were stripped at water-pump pressure at room temperature, and the residue was then pumped further for 4 hours at 3 mm. The colorless oily adduct weighed 0.35 g. (101%). The adduct from natural methyl sterculate was prepared similarly.

The two adducts were placed side by side on a chromatographic plate and were developed with hexane-benzene (10:1). Sulfuric acid spray brought out identical spots at $R_f$ 0.55. Both samples showed very faint spots at $R_f$ 0.89 probably due to a trace of unchanged methyl sterculate. In another run with a different methyl adduct of synthetic material using chromatographic plates, hexane-ether (12:1), and iodine vapor detection, only a single spot was seen at $R_f$ 0.55.

The two adducts were analyzed on a 6 ft. silicone column (10% SF 96) at a column temperature of 232° and argon pressure of 22 lb./in. The curves were identical, both showing a single symmetrical peak at 34.4 min. and a very small peak (less than 1%) at 15 min. attributable possibly to unchanged methyl sterculate.

The two adducts gave infrared absorption curves that were superposable; the curves showed neither the cyclopropene 1875 cm.$^{-1}$ absorption nor—what is probably more significant—the more intense peak at ca. 1000 cm.$^{-1}$. The nuclear magnetic resonance curves for the two adducts were identical.

I claim:

1. A process for preparing methyl sterculate which process comprises:
   (a) reacting methyl stearolate and diazoacetic ester in the presence of copper bronze to form methyl 9,10-carbethoxymethano)-9-octadecenoate,
   (b) saponifying the diester from (a) to give the diacid,
   (c) treating the diacid from (b) with an acid chloride selected from the group consisting of thionyl chloride and oxalyl chloride to give the bis-acid chloride,
   (d) treating the bis-acid chloride from (c) with a Lewis acid selected from the group consisting of zinc chloride, aluminum chloride and ferric chloride to give the cyclopropenium ion-acid chloride,
   (e) esterifying the cyclopropenium ion-acid chloride to give cyclopropenium ion ester,
   (f) reducing the cyclopropenium ion ester with a mixed metal hydride to give methyl sterculate.

2. A compound represented by the formula

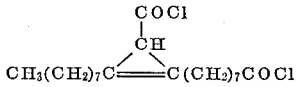

References Cited

Chemical Abstracts, vol. 64, 14101b (1966).

J. Am. Chem. Soc., vol. 91 (9) 2397–98 (4/23/69).

LEWIS GOTTS, Primary Examiner

D. G. RIVERS, Assistant Examiner

U.S. Cl. X.R.

260—399, 408, 514 P, 544 L